(12) United States Patent
Katsaros

(10) Patent No.: US 10,247,235 B2
(45) Date of Patent: Apr. 2, 2019

(54) METHOD FOR ADJUSTING THE PRELOAD IN A BEARING ASSEMBLY AND BEARING ASSEMBLY

(71) Applicant: Aktiebolaget SKF, Gothenburg (SE)

(72) Inventor: Padelis Katsaros, Schweinfurt (DE)

(73) Assignee: Aktiebolaget SKF, Göteborg (SE)

( * ) Notice: Subject to any disclaimer, the term of this patent is extended or adjusted under 35 U.S.C. 154(b) by 142 days.

(21) Appl. No.: 15/324,544

(22) PCT Filed: Jul. 16, 2015

(86) PCT No.: PCT/EP2015/066224
§ 371 (c)(1),
(2) Date: Jan. 6, 2017

(87) PCT Pub. No.: WO2016/008957
PCT Pub. Date: Jan. 21, 2016

(65) Prior Publication Data
US 2018/0180093 A1 Jun. 28, 2018

(30) Foreign Application Priority Data
Jul. 16, 2014 (DE) .................. 10 2014 213 878

(51) Int. Cl.
| | |
|---|---|
| *F16C 23/06* | (2006.01) |
| *F16C 41/00* | (2006.01) |
| *F16C 25/06* | (2006.01) |
| *F16C 19/18* | (2006.01) |
| *F16C 19/38* | (2006.01) |

(Continued)

(52) U.S. Cl.
CPC ............ *F16C 25/06* (2013.01); *F16C 19/181* (2013.01); *F16C 19/385* (2013.01); *F16C 19/364* (2013.01); *F16C 19/548* (2013.01); *F16C 23/06* (2013.01); *F16C 2233/00* (2013.01)

(58) Field of Classification Search
CPC .... F16C 19/163; F16C 19/181; F16C 19/364; F16C 19/385; F16C 19/388; F16C 23/06; F16C 41/002; F16C 2229/00; F16C 2233/00; G01L 5/0019
See application file for complete search history.

(56) References Cited

U.S. PATENT DOCUMENTS 5,488,871 A * 2/1996 Harbottle .............. F16C 19/548
384/448
5,509,198 A 4/1996 Takamizawa et al.
(Continued)

FOREIGN PATENT DOCUMENTS

| | | |
|---|---|---|
| DE | 102007029571 A1 | 11/2008 |
| EP | 0534537 A1 * | 3/1993 ............ B23Q 1/262 |
| GB | 2279999 A | 1/1995 |

*Primary Examiner* — Phillip A Johnson
(74) *Attorney, Agent, or Firm* — Bryan Peckjian; SKF USA Inc. Patent Dept.

(57) ABSTRACT

A method for setting a preload in a bearing assembly, the bearing assembly having at least one rolling-element bearing with at least one bearing inner ring and at least one bearing outer ring, the method including changing the preload in the bearing assembly starting from an initial value and measuring the electrical resistance between the bearing inner ring and the bearing outer ring and terminating the changing of the preload in the bearing assembly in response to a target value for the electrical resistance being reached.

10 Claims, 2 Drawing Sheets

(51) Int. Cl.
*F16C 19/36* (2006.01)
*F16C 19/54* (2006.01)

(56) References Cited

U.S. PATENT DOCUMENTS

| | | | |
|---|---|---|---|
| 6,394,657 B1 | 5/2002 | Takamizawa et al. | |
| 7,665,372 B2* | 2/2010 | Ueno | F16C 19/184 |
| | | | 73/862.322 |
| 2006/0243068 A1* | 11/2006 | Ueno | F16C 19/184 |
| | | | 73/862.322 |
| 2010/0299926 A1* | 12/2010 | Stitzinger | F16C 19/52 |
| | | | 29/898.09 |
| 2014/0020250 A1* | 1/2014 | Labelle | F16C 43/04 |
| | | | 29/898.09 |

* cited by examiner

METHOD FOR ADJUSTING THE PRELOAD IN A BEARING ASSEMBLY AND BEARING ASSEMBLY

CROSS-REFERENCE

This application is the U.S. National Stage of International Application No. PCT/EP2015/066224 filed on Jul. 16, 2015, which claims priority to German patent application no. 10 2014 213 878.7 filed on Jul. 16, 2014.

TECHNOLOGICAL FIELD

The invention relates to a method for setting the preload in a bearing assembly, wherein the bearing assembly comprises at least one rolling-element bearing including at least one bearing inner ring and at least one bearing outer ring. Furthermore, the invention relates to a bearing assembly including a device for setting the preload.

BACKGROUND

Preloaded bearing assemblies are well-known and common in the prior art. Often two tapered roller bearings (but, for example, also angular contact ball bearings, axial roller bearings, axial ball bearings) are tensioned against each other in order to achieve a clearance-free supporting, for example, of a shaft in a housing.

Setting the preload in a bearing assembly of the described type, in particular with the use of tapered and angular contact ball bearings, is a laborious and often inaccurate process. Here according to a first possibility it is attempted to set the correct preload such that the frictional torque of the bearing assembly is measured (a frictional-torque increase indicates an increase of the bearing preload), and upon reaching a predetermined value for the frictional torque by rotating a nut, then securing this nut against further twisting. Another method consists in measuring the individual components in the preload circuit and then generating the required preload path using a shim; the required preload path is then realized by tightening the nut against a stop defined by the shim, whereby the desired preload is generated.

However, the possibilities mentioned are either relatively inaccurate or very complex, with the result that there is a need for a method for setting the preload of a bearing assembly of the above-described type, which method is less complex but nonetheless delivers a sufficiently accurate result.

SUMMARY

The object of the invention is therefore to propose a method by which it is possible to be able to set the preload in the bearing in a simple manner. Nonetheless the preload should fall as precisely as possible within a prescribed tolerance.

The solution of this object by the invention is characterized in that the setting of the bearing preload is effected by the performing of the following steps:

a) increasing the preload in the bearing assembly starting from a lower initial value (which is usually zero) or reducing the preload in the bearing assembly starting from an upper initial value, and simultaneous measuring of the electrical resistance between the bearing inner ring and the bearing outer ring;

b) terminating the changing of the preload in the bearing assembly as soon as a target value for the electrical resistance is reached.

The mentioned target value for the electrical resistance is thereby preferably determined by a calibration measurement on the bearing assembly or on a substantially structurally identical bearing assembly, wherein the target value is defined as electrical resistance that is present when the desired preload prevails in the bearing assembly.

The bearing rings are preferably provided with an electrical insulation so that they are electrically insulated with respect to their respective attachments (shaft or housing). Here the bearing rings can be kept free of the electrical insulation at at least one point. The point at which the bearing rings are kept free of electrical insulation is preferably an end side of the bearing rings. At the uninsulated point a cable can be attached that leads to a resistance meter.

In the bearing assembly including a device for setting the preload said device for setting the preload inventively includes:

a resistance meter for measuring the electrical resistance between the bearing inner ring and the bearing outer ring;

an electrical connection between the resistance meter and the bearing inner ring, and an electrical connection between the resistance meter and the bearing outer ring;

an adjustment possibility for the preload in the bearing assembly (usually a shaft nut by whose tightening the preload can be increased).

Here the bearing inner ring is preferably provided with an electrical insulation so that it is electrically insulated with respect to its attachment, in particular a shaft. Accordingly the bearing outer ring is preferably provided with an electrical insulation so that it is electrically insulated with respect to its attachment, in particular a housing.

Here the bearing rings are preferably free of the electrical insulation at at least one point. This point is preferably an end side of the bearing rings.

The inventive setting of the preload in a bearing unit is thus based on the measuring of the electrical resistance of the bearing. The preload is thus determined and set via the measured electrical resistance of the system bearing-outer-ring—roller- or ball-set—bearing-inner-ring (the prerequisite for this of course is the electrical conductivity of the materials of which the bearing rings and rolling elements are comprised).

In all rolling-element bearing assemblies the rolling elements have simultaneous contact with the inner ring and the outer ring. Because of the differently curved contact surfaces of the rolling elements on the one hand and the raceway of the inner ring or of the outer ring on the other hand the known Hertzian contact arises. With such a contact the contact surface changes under influence of the contact load. If the load between the contact partners becomes larger the contact surface also increases; accordingly it decreases if the load is reduced. If the load approaches zero, the contact surface becomes a line or a point depending on the type of curvature of the contact partner.

The electrical resistance (R) of a conductor is determined directly proportionally by its specific resistance ($s_W$) and its length (L) and inversely proportionally by its current-carrying cross-section (A). With the values mentioned it thus applies that:

$$R = s_W \times L/A$$

When the bearing rings of a bearing are electrically insulated, for example, by a layer of insulating materials (known under the name INSOCOAT®) and the insulated bearing is installed, the electrical resistance of the bearing can be determined with little effort in the installed and preloaded state of the bearing. For this purpose, for example, one side surface per bearing ring, which side surface is partially or completely uninsulated, is sufficient. The measuring of the electrical resistance is then carried out with a corresponding resistance meter that can measure the electrical resistance between the uninsulated points between the inner ring and the outer ring.

Due to the mentioned physical fundamentals, with an increase of the contact load—caused by the applying or increasing of the preload—the resistance between the inner ring and the outer ring will decrease since the current-carrying Hertzian contact surface is larger under load.

In such a measurement all Hertzian contact between all rolling elements and the bearing rings are captured as the result of resistances connected in parallel.

The setting of the preload can thus be carried out with little effort. The influence of the coefficient of friction on the preload setting is practically eliminated.

The setting or measuring of the preload can even be carried out by workshops not specifically qualified for this that have a suitable resistance meter.

BRIEF DESCRIPTION OF THE DRAWINGS

An exemplary embodiment of the invention is illustrated in the drawings.

DETAILED DESCRIPTION

Figure 1:
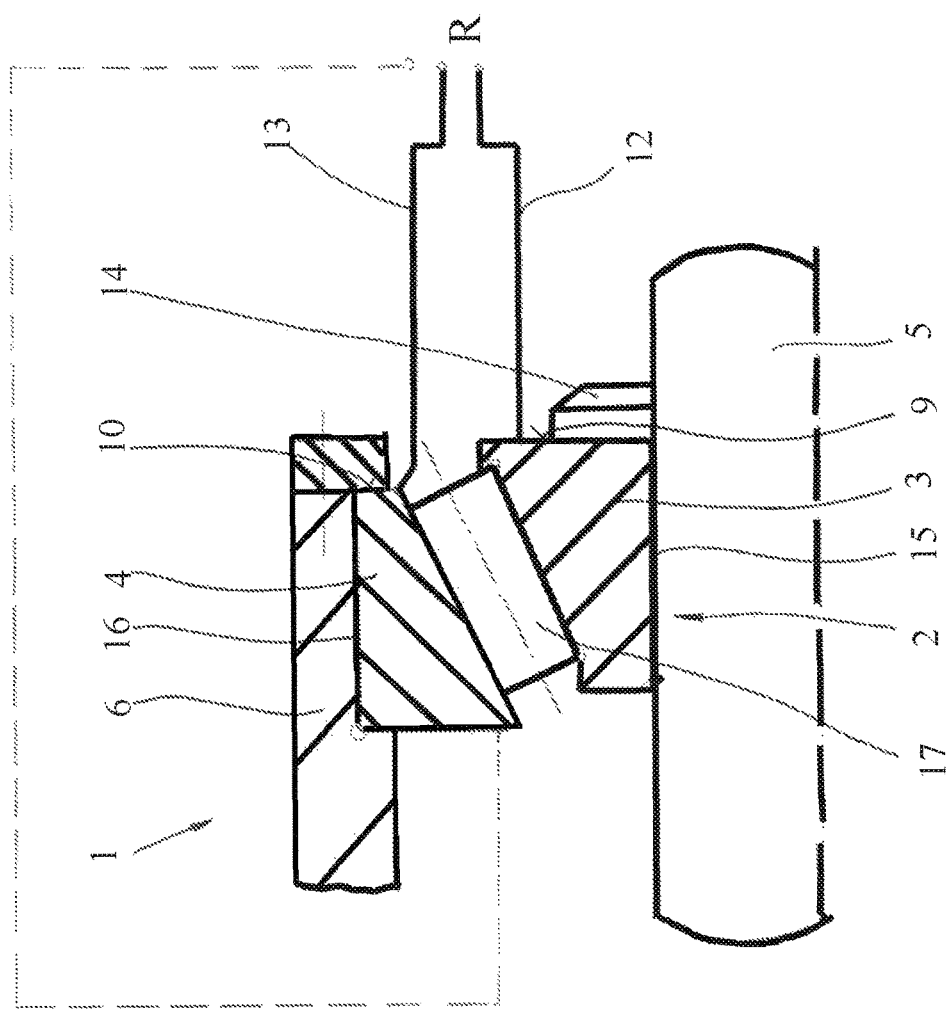
FIG. 1 shows a bearing assembly, of which one rolling-element bearing is depicted, using which a shaft is supported in a housing, and FIG. 2 schematically shows the measuring of the electrical resistance between the bearing rings for the purpose of determining the axial bearing preload.

In FIG. 1 a bearing assembly 1 is outlined, using which a shaft 5 is supported in a housing 6. For this purpose two rolling-element bearings 2, preloaded against each other, in the form of tapered roller bearings are used, of which only one is depicted in FIG. 1; the other, not-depicted bearing is likewise a tapered roller bearing and disposed on the left in FIG. 1, so that the two bearings are positioned in back-to-back arrangement. The rolling-element bearing 2 has a bearing inner ring 3 and a bearing outer ring 4, between which rolling elements 17 are disposed.

At the contact points to the attachments (shaft 5 and housing 6) the two bearing rings 3 and 4 include an electrical insulation 15 or 16. A current flow from bearing ring 3, 4 to attachment 5, 6 is thus prevented.

Figure 2:
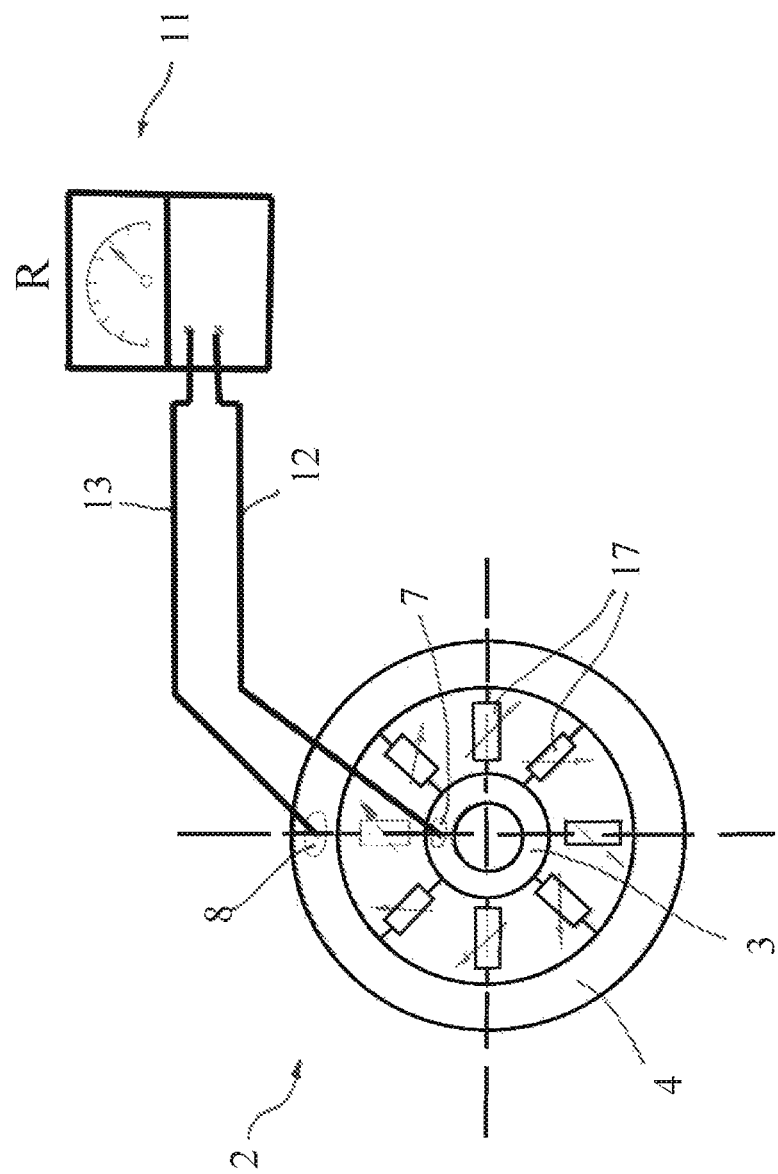

However, on their end sides 9 or 10 the two bearing rings 3, 4 each include an uninsulated point 7 or 8 as is apparent from FIG. 2. Here the rolling-element bearing 2 is schematically depicted, wherein, however, the rolling elements 17 are symbolized as resistances with variable electrical resistance. The electrical resistance between the bearing inner ring 3 and the bearing outer ring 4 with current flow through the rolling elements 17 is variable, since it depends on the preload by which the rolling-element bearing 2 is axially preloaded (see explanation above). The higher the preload is, the more strongly the rolling elements 17 and the bearing rings 3, 4 are pressed together. The contact surfaces of the Hertzian stress are thus larger and the electrical resistance R smaller.

This is presently utilized to determine the degree of the axial preload.

This is particularly apparent from FIG. 2. Here it can be seen how an electrical connection 12 between the bearing inner ring 3 and a resistance meter 11 as well as an electrical connection 13 between the bearing outer ring 4 and the resistance meter 11 has been produced.

Now initially a low preload value is started with (preferably with the preload zero) for setting the preload. For this purpose an adjustment means for the preload in the form of a nut 14 is initially tightened only with slight torque. The electrical resistance R is measured.

It can be provided here that the bearing rings 3, 4 are free of an insulation at a plurality of points. Then the contact can be produced at a plurality of points of the respective bearing ring and an average value of the resistance can be formed. This increases the accuracy of the proposed method.

In FIG. 1 the possibility is also drawn with dashed lines that alternatively or additionally the bearing outer ring 4 (the same applies to the bearing inner ring) is also contacted by its other end side and provided with a cable.

However if only the contact with the outer ring 4 depicted with dashed lines is selected and the inner ring 3 is provided with a cable in the manner depicted, the current flows directly through the rolling elements 17, i.e., the current flow in this case is conducted in an improved manner through the rolling elements 17, which supports the proposed procedure.

With further tightening of the nut 14 the preload increases. Thus the bearing rings and rolling elements are pressed together more strongly. The electrical resistance R thus decreases.

The nut 14 is now tightened further until the electrical resistance $R_{actual}$ (actual value) corresponds to a prescribed target value $R_{target}$, which has been obtained from a calibration measurement.

Thus the desired degree of the preload can be set in a simple manner

REFERENCE NUMBER LIST

1 Bearing assembly
2 Rolling-element bearing
3 Bearing inner ring
4 Bearing outer ring
5 Attachment (shaft)
6 Attachment (housing)
7 Uninsulated point
8 Uninsulated point
9 End side
10 End side
11 Resistance meter
12 Electrical connection
13 Electrical connection
14 Adjusting possibility (nut)
15 Electrical insulation of the bearing inner ring
16 Electrical insulation of the bearing outer ring
17 Rolling element
$R_{actual}$ Electrical resistance
$R_{target}$ Target value for the electrical resistance

The invention claimed is:

1. A method for setting a preload in a bearing assembly, wherein the bearing assembly comprises at least one rolling-element bearing with at least one bearing inner ring and at least one bearing outer ring, and wherein the at least one bearing inner ring and the at least one bearing outer ring are provided with an electrical insulation so that they are electrically isolated with respect to their respective attachments, the method comprising:

a) increasing the preload in the bearing assembly starting from a first initial value, or decreasing the preload in the bearing assembly starting from a second initial value, and measuring the electrical resistance between the bearing inner ring and the bearing outer ring; and b) terminating the changing of the preload in the bearing assembly in response to a target value for the electrical resistance being reached.

2. The method according to claim 1, wherein the target value for the electrical resistance is determined by a calibration measurement on the bearing assembly or on a substantially structurally identical bearing assembly, wherein the target value is defined as an electrical resistance that is present when a desired preload prevails in the bearing assembly.

3. The method according to claim 1, wherein the at least one bearing inner ring and the at least one bearing outer ring are free of the electrical insulation at at least one point.

4. The method according to claim 3, wherein the point at which the at least one bearing inner ring and the at least one bearing outer ring are kept free of electrical insulation is an end side of the at least one bearing inner ring and the at least one bearing outer ring.

5. The method according to claim 1, wherein the electrical resistance is measured while the preload in the bearing assembly is being increased or decreased.

6. The method according to claim 1 including:
determining the target value by:
setting a preload of a reference bearing assembly, the reference bearing assembly being substantially identical to the bearing assembly; and
measuring an electrical resistance of the reference bearing assembly by measuring an electrical resistance between a first point on a bearing inner ring of the reference bearing assembly and a second point on a bearing outer ring of the reference bearing assembly.

7. A bearing assembly including a device for setting preload, wherein the bearing assembly comprises at least one rolling-element bearing including at least one bearing inner ring and at least one bearing outer ring, wherein the device for setting the preload comprises:

a resistance meter for measuring the electrical resistance between the bearing inner ring and the bearing outer ring;

an electrical connection between the resistance meter and the bearing inner ring, and an electrical connection between the resistance meter and the bearing outer ring;

an adjusting possibility for the preload in the bearing assembly.

8. The bearing assembly according to claim 7, wherein the bearing inner ring and/or the bearing outer ring is provided with an electrical insulation so that the bearing inner ring and/or the bearing outer ring is electrically insulated with respect to its attachment.

9. The bearing assembly according to claim 8 wherein the bearing rings are free of the electrical insulation at at least one point.

10. The bearing assembly according to claim 9, wherein the point at which the bearing rings are kept free of electrical insulation is located at an end side of the bearing rings.

* * * * *